US010407991B2

(12) United States Patent
Metcalf et al.

(10) Patent No.: US 10,407,991 B2
(45) Date of Patent: Sep. 10, 2019

(54) DRILL STRING ROTATION BRAKE

(71) Applicant: The Charles Machine Works, Inc., Perry, OK (US)

(72) Inventors: Max A. Metcalf, Stillwater, OK (US); Philip J. Wosmek, Perry, OK (US); Harry Bendure, Perry, OK (US); Rick E. Barrett, Owasso, OK (US)

(73) Assignee: The Charles Machine Works, Inc., Perry, OK (US)

( * ) Notice: Subject to any disclaimer, the term of this patent is extended or adjusted under 35 U.S.C. 154(b) by 431 days.

(21) Appl. No.: 14/846,156

(22) Filed: Sep. 4, 2015

(65) Prior Publication Data

US 2016/0069136 A1 Mar. 10, 2016

Related U.S. Application Data

(60) Provisional application No. 62/048,120, filed on Sep. 9, 2014.

(51) Int. Cl.
*E21B 3/04* (2006.01)
*E21B 7/04* (2006.01)
*E21B 15/04* (2006.01)
*E21B 17/03* (2006.01)
*E21B 19/16* (2006.01)

(52) U.S. Cl.
CPC .............. *E21B 7/046* (2013.01); *E21B 15/04* (2013.01); *E21B 17/03* (2013.01); *E21B 19/16* (2013.01)

(58) Field of Classification Search
CPC . E21B 7/046; E21B 7/03; E21B 19/16; E21B 15/04; E21B 17/03

USPC ....................................... 173/213, 4, 19, 156
See application file for complete search history.

(56) References Cited

U.S. PATENT DOCUMENTS

| 2,667,820 | A | * | 2/1954 | De Vlieg | ............... | B23B 31/266 |
| | | | | | | 409/233 |
| 3,470,968 | A | * | 10/1969 | Melsheimer | ............ | E21B 19/08 |
| | | | | | | 173/164 |
| 4,078,452 | A | * | 3/1978 | Rosler | .................... | B65G 43/02 |
| | | | | | | 475/83 |
| 7,134,513 | B1 | * | 11/2006 | Randall | .................... | E21B 7/201 |
| | | | | | | 175/122 |
| 7,628,226 | B2 | * | 12/2009 | Mitchell | ............... | E21B 19/165 |
| | | | | | | 175/19 |
| 2007/0034458 | A1 | * | 2/2007 | Rogers | .................... | F16D 55/38 |
| | | | | | | 188/71.4 |
| 2014/0050522 | A1 | * | 2/2014 | Slaughter, Jr. | .......... | F16D 1/033 |
| | | | | | | 403/342 |

FOREIGN PATENT DOCUMENTS

GB 727603 A * 4/1955 ............. E21B 3/035

* cited by examiner

*Primary Examiner* — Nicole Coy
(74) *Attorney, Agent, or Firm* — Tomlinson McKinstry, P.C.

(57) ABSTRACT

A rotation brake for stopping rotation of a spindle assembly on a horizontal directional drill. The rotation brake comprises a brake lock that is actuated by a cylinder and spring to interact with a non-rotating brake cap and a rotating pinion, thereby stopping rotation of the pinion. The brake lock is removed from the pinion by applying pressurized fluid to a cylinder such that a cylinder rod moves the brake lock out of a cavity between the brake cap and the pinion. Upon removing fluid pressure from the cylinder, a compressed spring moves the brake lock back to into the cavity, preventing rotation.

30 Claims, 7 Drawing Sheets

DRILL STRING ROTATION BRAKE

CROSS REFERENCE TO RELATED APPLICATION

This application claims the benefit of U.S. Provisional Patent Application Ser. No. 62/048,120, filed Sep. 9, 2014, the entire contents of both which are incorporated herein by reference.

FIELD

This invention relates generally to drive systems for horizontal directional drills.

SUMMARY

The invention is directed to an apparatus for making up and breaking out a pipe segment from a drill string. The apparatus comprises a motor, a pinion, a spindle, and a brake assembly. The pinion is rotationally driven by the motor. The spindle is rotationally driven by the motor and locked to the pinion. The spindle is also connectible to a pipe segment. The brake assembly comprises a brake lock and an actuator. The brake lock at least partially conforms the pinion. The actuator moves the brake lock between a first position and a second position. The brake lock and pinion are not in contact when the brake lock is in the first position and are rotationally locked when the brake lock is in the second position.

A method of stopping rotation of a spindle assembly for use with a horizontal directional drill. The spindle assembly comprises a spindle, a motor for driving rotation of the spindle, and a pinion rotationally fixed to the spindle. The method comprises rotating the spindle and the pinion, providing a brake lock movable from a first position to a second position, moving the brake lock from the first position to a second position such that the brake lock interacts with the pinion and stops its rotation.

DESCRIPTION OF THE PREFERRED EMBODIMENTS

Figure 1:
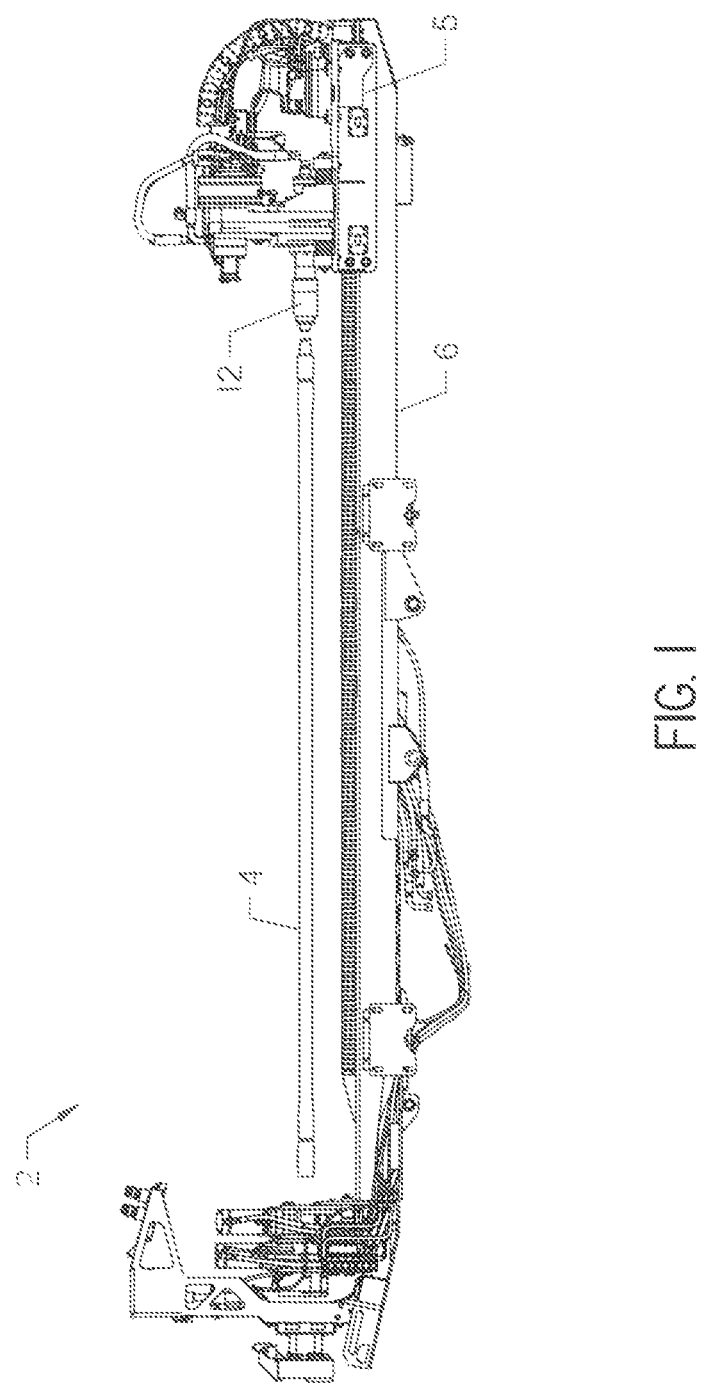
FIG. 1 is a side view of a horizontal directional drill having a pipe segment in position for connection to a spindle assembly.

The present invention is directed to a rotation brake for the spindle on a horizontal directional drill (HDD) system. With reference to FIG. 1, a horizontal directional drill 2 "makes up" pipe segments 4 to form a "drill string", then advances the drill string forward through rotation and thrust provided to a drill bit (not shown). The process is repeated until a borehole of a desired length is created. Also, the HDD system 2 may be used with a "backreamer", wherein a drill string is pulled back through a pilot bore, and thrust and rotation are provided at a backreaming bit to enlarge the pilot bore. In this method, sections of pipe are removed from the drill string by the HDD system as the backreamer is pulled through the bore.

It should be understood that during repetitive drilling operations, a spindle assembly 12 is rotated and advanced by a carriage 5 until the spindle assembly is at its full range of travel forward relative to a drill frame 6. At this point, the spindle assembly 12 is disconnected from the drill string so that the next pipe section can be added to extend the overall length of the drill string. The rotation provided to the output gear during drilling is in a first rotational direction, while a second rotational direction is used when the spindle is unthreaded from the drill string.

Figure 2:
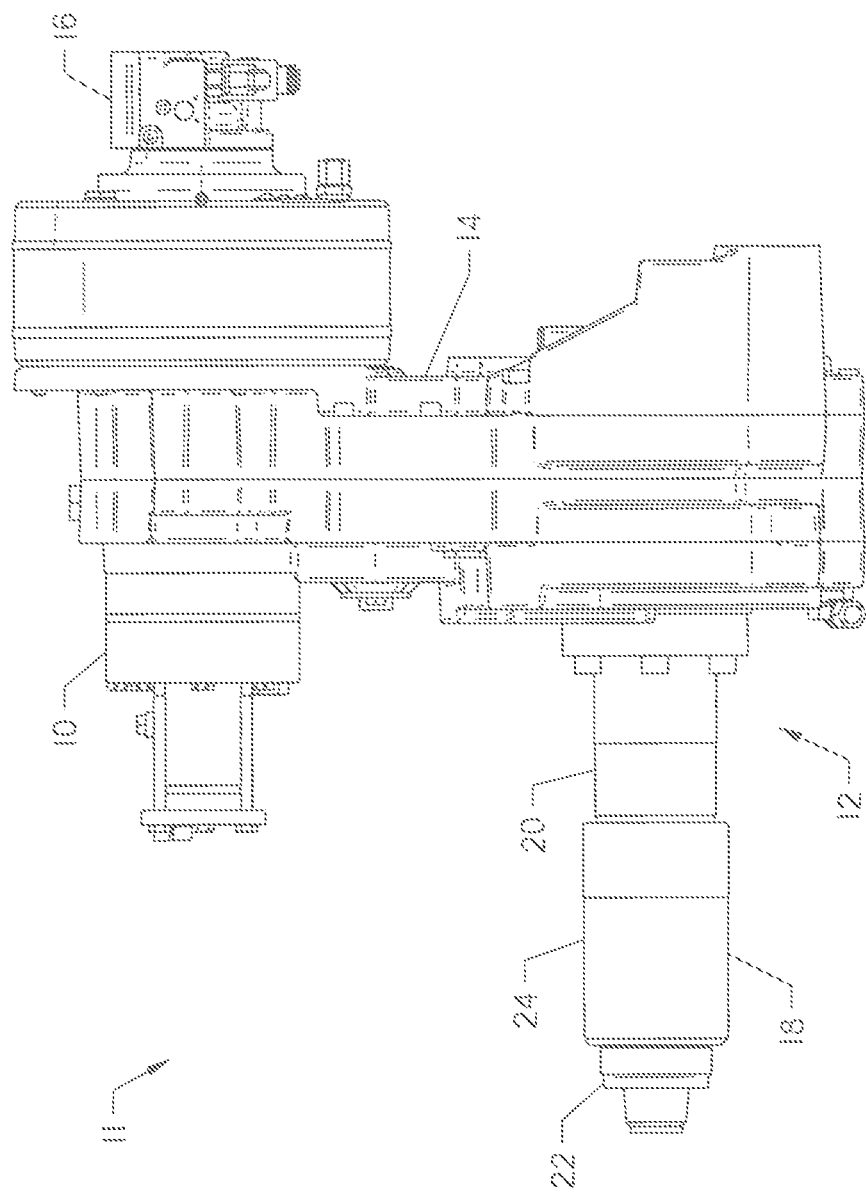
FIG. 2 is a side view of a rotation assembly for use with the horizontal directional drill of FIG. 1.

Turning now to FIG. 2, shown therein is a rotation brake 10 for use with a rotation assembly 11. The rotation assembly 11 comprises the spindle assembly 12, a gearbox 14 and a motor 16. The rotation brake 10 is utilized to stop rotation of the spindle assembly 12. The motor 16 turns gear and pinion elements 30, 32, 34 (FIG. 3) within the gearbox 14 which, in turn, rotate the spindle assembly 12.

The spindle assembly 12 comprises a drill string connection 18. The connection 18, as shown, comprises a drive chuck, or shaft 20 and a saver subassembly 22. The shaft 20 is preferably connected by a collar 24 to the saver subassembly 22. The saver subassembly 22 is adapted to thread onto pipe segments 4 (FIG. 1) that are being made up and broken out from a drill string. By utilizing the saver subassembly 22, a replaceable part, an operator is insulated from wear associated with repeated threading and unthreading from the segments 4 of drill string. An example of a saver subassembly is shown in U.S. Patent Publication No. 2014/0050522, the contents of which are incorporated herein by reference.

Figure 3:
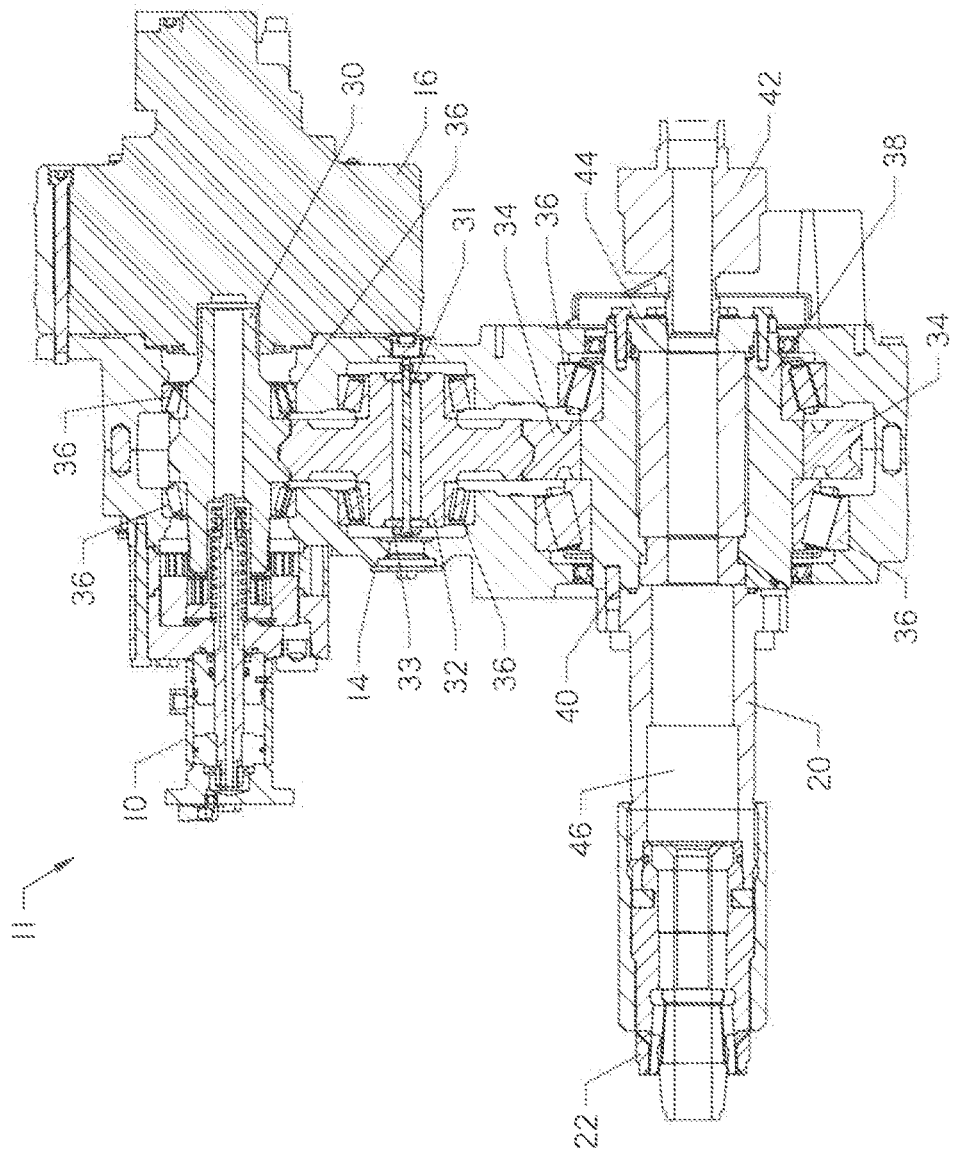
FIG. 3 is a sectional side view of the rotation assembly and rotation brake of FIG. 2.

With reference now to FIG. 3, the rotation assembly 11 of FIG. 2 is shown in section. The gearbox 14 comprises a motor output pinion 30, a central gear 32, and a spindle output gear 34. Each of the motor output pinion 30, central gear 32, and spindle output gear 34 are rotationally supported within the gearbox 14 by bearings 36. The motor output pinion 30 is rotationally driven by motor 16. In turn, the pinion 30 interfaces with central gear 32, which likewise drives spindle output gear 34. The central gear 32 rotates about screw 31 which is connected to the gearbox 14 by a vented washer 33. The vented washer 33 allows gasses within and proximate the central gear 32 to vent to the environment when pressure increases due to rotation of the central gear. The spindle output gear 34 is rotationally locked to output shaft 38, which is connected to the drive chuck shaft 20 of the spindle assembly 12. As shown, the drive chuck shaft 20 is attached to the output shaft 38 by bolts 40. Rotation of the motor output pinion 30, central gear 32, spindle output gear 34 and drive chuck shaft 20, and therefore connected pipe segments 4 (FIG. 1) are driven by the motor 16. Actuation of the rotation brake 10, which will be discussed in further detail with respect to FIGS. 4-7, stops or prevents rotation of these elements.

The rotation assembly 11 further comprises a water swivel 42 attached to the back of the output shaft 40 through an output cap 44. The water swivel 42 is a rotating connection element that allows for drilling fluids, such as water, air, bentonite, and other known fluids, to be provided between a high-pressure pump (not shown) for providing the drilling fluid, and the rotating elements of the drill string and output shaft 40. Fluid provided through the water swivel 42 enters the drill string (not shown) during drilling operations through an internal passage 46 located within the output shaft 40, drive chuck 20, and saver subassembly 22.

Figure 4:
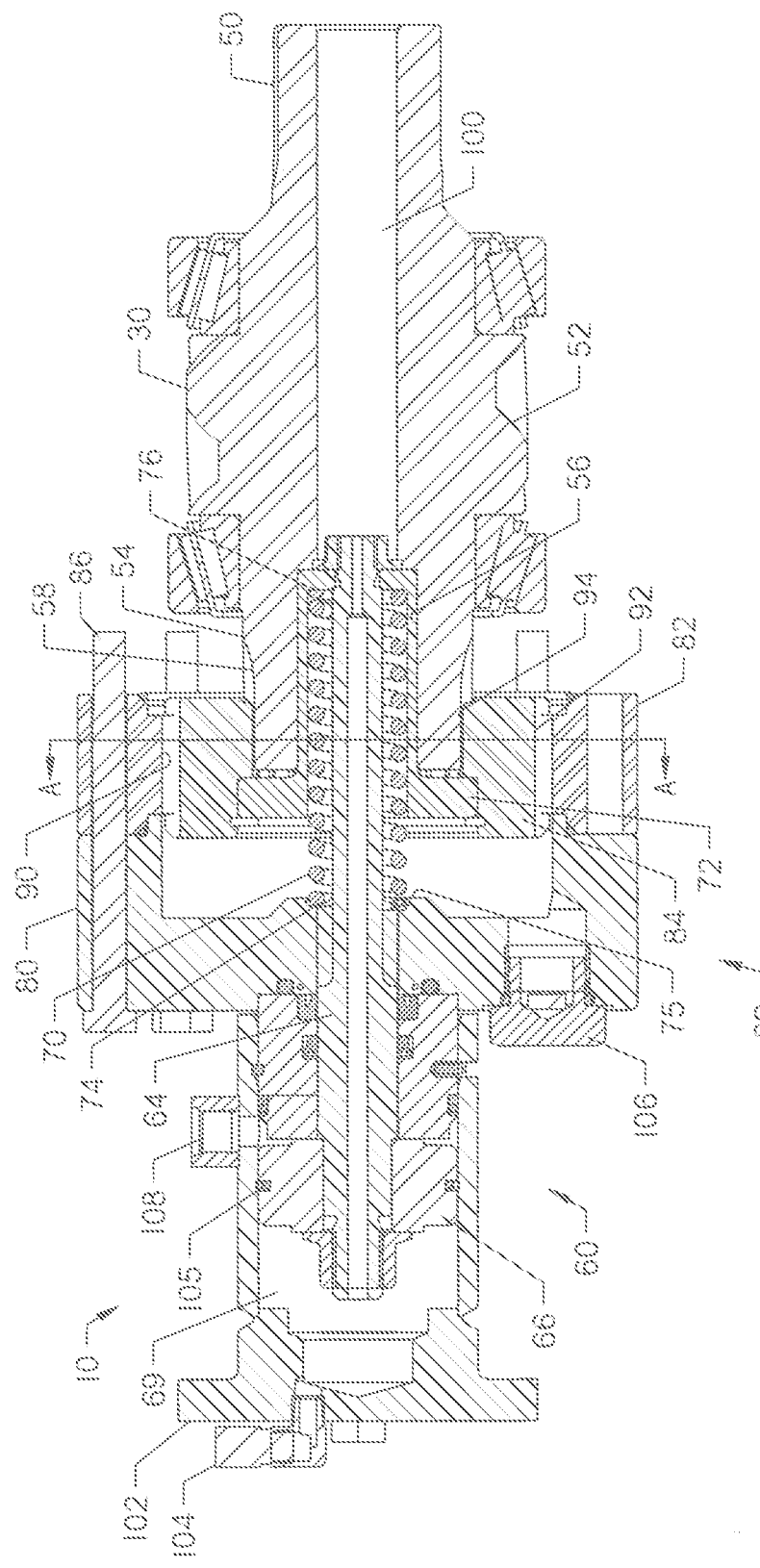
FIG. 4 is a sectional view of a rotation brake shown in FIG. 3 in the engaged position.

With reference now to FIG. 4, the rotation brake 10 is shown in more detail. As shown, the motor output pinion 30 is shown with neighboring elements of the gearbox 14 removed for clarity. The motor output pinion 30 comprises a motor connection 50, a plurality of teeth 52, and a lock interface 54. The motor connection 50 is rotationally driven by the motor 16 (FIG. 3), which turns the entire motor output pinion 30. The teeth 52 interact with the central gear 32 (FIG. 3). The lock interface 54 is sized to engage with the rotation brake 10. As shown, the lock interface 54 comprises an internal cavity 56 and a plurality of external splines 58. The cavity 56 and splines 58 enable the connection between the rotation brake 10 and lock interface 54 as will be discussed in more detail below.

Figure 5:
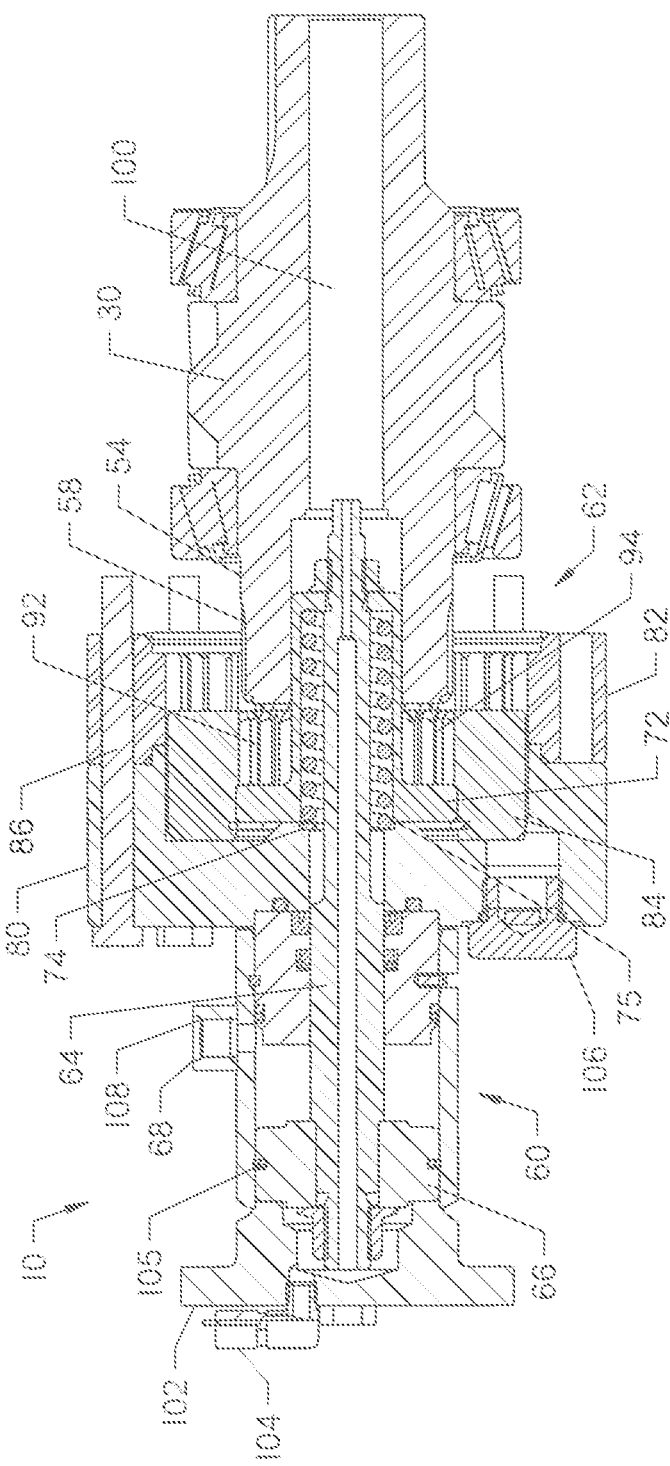
FIG. 5 is a sectional view of the rotation brake of FIG. 4 in the disengaged position.

The rotation brake 10 is movable between an engaged position and a disengaged position. In the engaged position, as shown in FIG. 4, the rotation brake 10 engages the lock interface 54, preventing rotation of the motor output pinion 30 relative to the rotation brake 10. Rotation of the spindle assembly 12 (FIG. 3) will be prevented by the rotation brake 10 being in the engaged position. In the disengaged position, as shown in FIG. 5, the rotation brake 10 does not engage the lock interface 54 and the motor output pinion 30 rotates freely relative to the rotation brake. One of ordinary skill in the art will appreciate that when the rotation brake 10 is moved to the engaged position, it is advantageous to take steps to protect the motor 16 (FIG. 3) from damage. For example, engagement of the rotation brake 10 may cause the motor 16 to be placed into neutral, slowed or stopped.

With reference again to FIG. 4, the rotation brake 10 comprises an actuator assembly 60 and a brake assembly 62. The actuator assembly 60 comprises a cylinder rod 64, a piston 66, a cylinder coupler 68, a hydraulic chamber 69 and a compression spring 70. The compression spring 70 is contained within a spring housing 72 and engaged at a first end 74 to a reaction wall 75 and at a second end 76 to the spring housing. As shown, the spring housing 72 fits within the internal cavity 56 of the motor output pinion 30.

The cylinder rod 64 is coupled to the spring housing 72, Pressurized fluid, such as hydraulic fluid, may be applied to the hydraulic chamber 69 of the actuator assembly 60 through the cylinder coupler 68. The fluid causes the chamber 69 to expand and the piston 66 to move away from the motor output pinion 30. The piston 66 is coupled to the cylinder rod 64. Therefore, as the actuator assembly 60 is activated by fluid, the cylinder rod 64 and spring housing 72 move away from the motor output pinion 30. Additionally, the compression spring 70 is compressed as the distance between the reaction wall 75 and the spring housing 72 decreases.

The brake assembly 62 comprises a brake cover 80, a brake cap 82, and a brake lock 84. The brake cover 80 is attached by connectors 86 to the gearbox 14 (FIG. 2) and not rotatable relative to the gearbox. As shown, the connectors 86 are bolts or screws. The brake cap 82 is attached to the brake cover 80 between the brake cover and the gearbox 14 by the connectors 86. The brake cap 82 is shown as a separate element from the brake cover 80, though these may be integrally formed. The brake cap 82 comprises internal features such as splines 90.

The brake lock 84 comprises external features, such as splines 92 for engaging the splines 90 of the brake cap. Additionally, the brake lock 84 comprises internal features, such as splines 94 for engaging the lock interface 54. The brake lock 84 is attached to the spring housing 72 and thus movable from a first position to a second position by actuation of the actuator assembly 60. In the first position, as shown in FIG. 5, the piston 66 is fully to the left, meaning that the spring housing 72 moves the brake lock 84 such that the splines 94 of the brake lock do not engage with the lock interface 54. Therefore, the rotation brake 10 is in the disengaged position. In the second position, as shown in FIG. 4, the piston 66 is moved to the right by expansion of the compression spring 70, causing the brake lock 84 to be moved into a cavity between the brake cap 82 and the lock interface 54. The brake cap 82 does not rotate, meaning that the brake lock 84 holds the lock interface 54 in place, thus stopping or preventing rotation of the motor output pinion 30. When the brake lock 84 is in the second position, the rotation brake 10 is engaged.

While the actuator assembly 60 is shown with a hydraulically actuated piston 66 and a compression spring 70 moving the cylinder rod 64 in response to changes in fluid pressure, other actuator assemblies may be contemplated, such as dual-action hydraulic cylinders, screw drives, etc. Further, while the compression spring 70 of the current invention biases the rotation brake to an engaged position in the absence of fluid pressure, the opposite configuration may be utilized such that hydraulic pressure is required for activation of the rotation brake.

While the features shown for interaction between the rotation brake 10 and motor output pinion 30 are splines 90, 92, 94, other features may be utilized, such as geometric profiles (for example, hexagonal cavities), rotational stops, etc. Additionally, the interface between the brake lock 84 and brake cap 82, and/or the interface between the brake lock 84 and lock interface 54, may allow for some spring resistance when in the second position to quickly slow then stop is rotation of the motor output pinion 30 rather than providing an instantaneous stop.

Rotation of the motor output pinion 30 and actuation of the rotation brake 10 may cause pressure to build up in the gearbox 14. An internal passage 100 exists due to a central bore through the motor output pinion 30, spring housing 72 and cylinder rod 64. The internal passage should allow transmission of pressure changes between the gearbox 14 and a barrel end 102 of the rotation brake 10. An air vent 104 is provided at the barrel end 102 of the rotation brake 10 such that sudden increase and decrease of pressure within the gearbox 14 is translated to the atmosphere, preventing pressure-related resistance to actuation of the rotation brake 10. O-Rings 105 are placed about a periphery of the piston 66 to isolate the air existing in the barrel end 102 from the hydraulic chamber 69 of the barrel end. A mechanical switch 108, pressure sensor, or the like may be provided at the coupler 68 or elsewhere to indicate the hydraulic pressure in the chamber 69. This information may be provided to a control system (not shown) to indicate whether the brake 10 is actuated such that the motor 16 (FIG. 2) may be slowed or placed in neutral.

Figure 6:
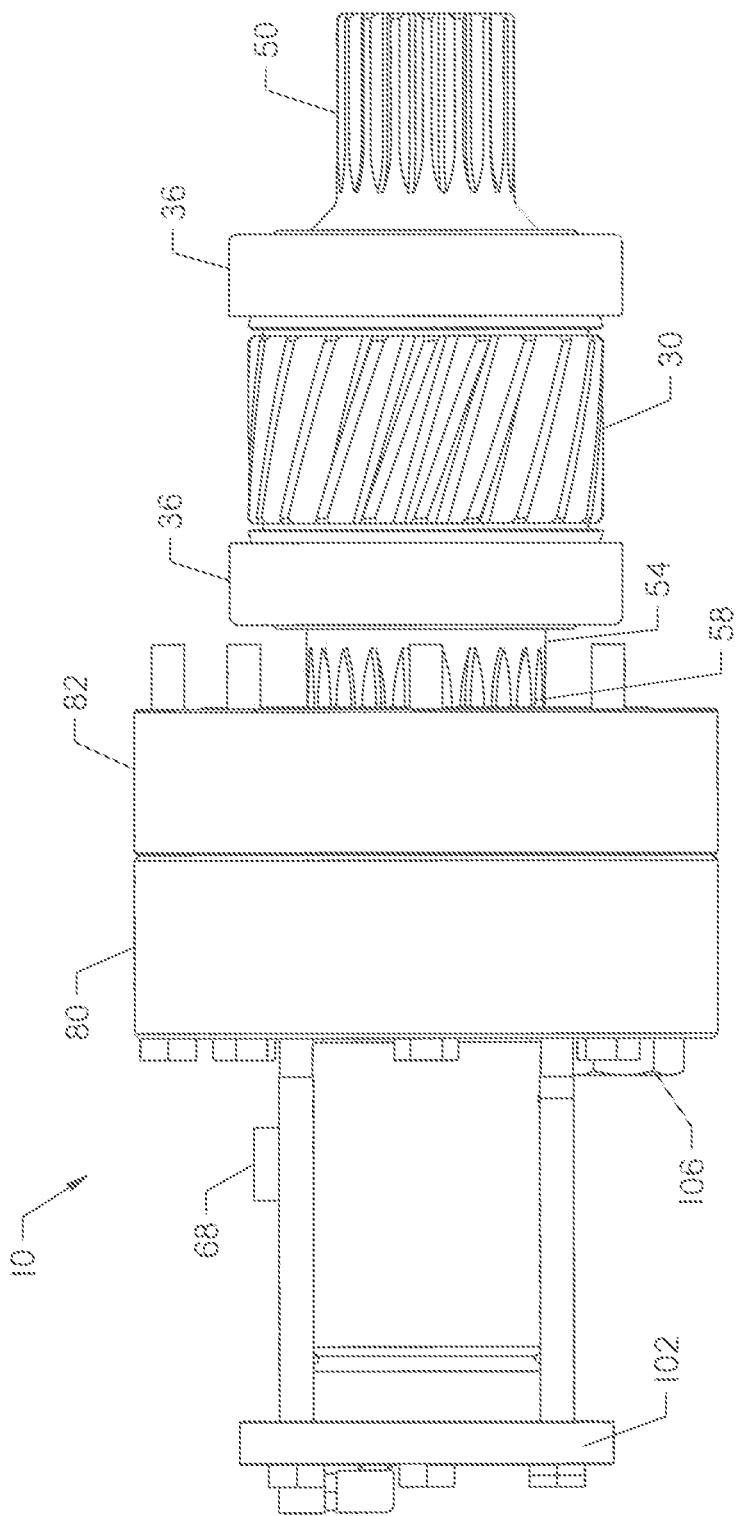
FIG. 6 is a side view of the rotation brake of FIG. 4.

With reference now to FIG. 6, the rotation brake 10 is shown from the side with the gearbox 14 removed. The splines 58 of the lock interface 54 are shown in detail. Preferably, the splines 58 taper from a wider profile proximate rotation brake 10 to a smaller profile further from the rotation brake. In this way, corresponding splines 94 of the brake lock 84 engage more easily with the rotating lock interface 54 upon actuation of the rotation brake 10 while allowing for a tight connection when fully engaged. One of ordinary skill will appreciate that the compression spring 70 allows the brake lock 84 to recoil if the splines 58 of the lock interface 54 and splines 94 of the brake lock 84 do not immediately mate upon actuation of the rotation brake 10. A magnetic plug 106 is provided to access, lubricate and clean the area proximate the brake lock 84 within the brake cover 80. The coupler 68 may be connected to a hose (not shown) or other connection for transmission of pressurized fluid.

Figure 7:
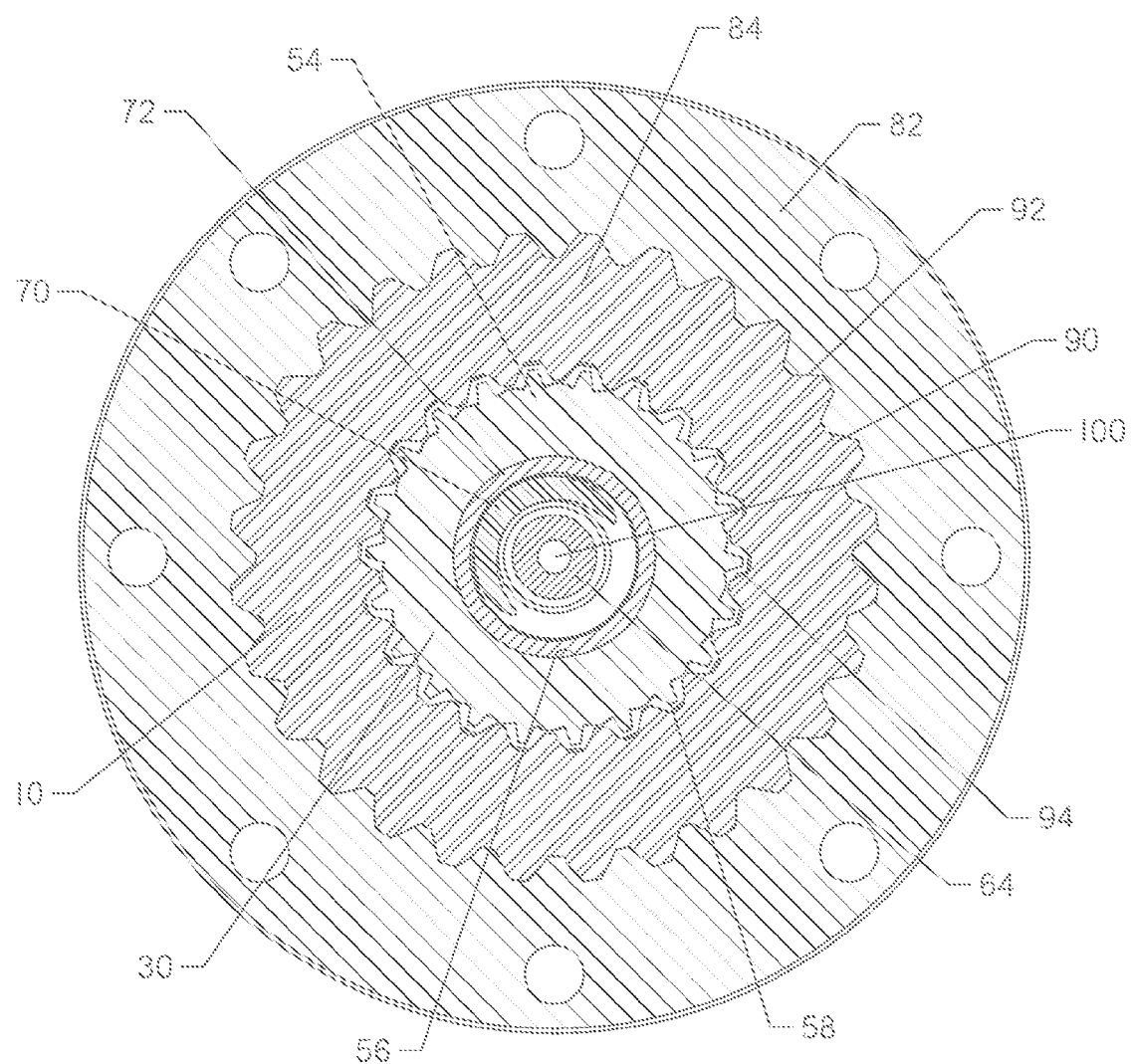
FIG. 7 is a front view of Section A-A of FIG. 4.

With reference now to FIG. 7, a cross-section A-A of FIG. 4 is provided to give clarity to the engagement between the motor output pinion 30 and the rotation brake 10. The splines 90 of brake cap 82 interact with external spines 92 of brake lock 84, The splines 58 of the lock interface 54 interact with internal splines 94 of brake lock 84. Therefore, no relative rotation is allowed between the brake cap 82 and lock interface 54 of the pinion 30 when the brake lock 84 is engaged. The spring housing 72 is located within a cavity 56 of lock interface 54. The spring housing 72 and brake lock 84, as described with reference to FIG. 4, move in concert. As shown in FIGS. 4 and 7, the compression spring 70 provides engagement force to the brake lock 84 and spring housing 72, while actuation of the cylinder rod 64 causes the brake lock 84 and spring housing 72 to move out of engagement with the lock interface 54. The internal passage 100 is shown within the cylinder rod 64 in FIG. 7.

In operation, with the rotation brake 10 disengaged, the spindle assembly 12 is rotated by the motor 16 to connect to a pipe segment 4. The spindle assembly 12 is then advanced along the drill frame 6 while rotating to connect the pipe segment 4 to a drill string. The spindle assembly 12 continues rotation and advancement to advance the drill string into the ground. As shown in FIGS. 4 and 5, the rotation brake 10 is engaged by removal of hydraulic pressure applied through cylinder coupler 68, causing the piston 66 and cylinder rod 64 be pulled by compression spring 70. The brake lock 84 then engages the brake cap 82 and the lock interface 54 of the motor output pinion 30 to cause rotation to stop. Optionally, the motor 16 may be placed into neutral by a control system, such as a mechanical switch 108 (FIGS. 4-5), upon loss of hydraulic pressure in cylinder coupler 68.

The rotation brake 10 is then disengaged, and the rotation of the spindle assembly 12 reversed to disconnect the spindle assembly from pipe segment 4. As shown in FIGS. 4 and 5, the rotation brake is disengaged through addition of hydraulic pressure through cylinder coupler 68, causing the piston and cylinder rod to compress compression spring 70. The brake lock 84 is removed from engagement with and allows relative rotation between the lock interface 54 and brake cap 82. Optionally, the motor 16 may not be activated until after the rotation brake 10 is disengaged, though preferably the rotation brake is powerful enough to disengage the brake lock 84 even when the motor is active. After the spindle assembly 12 is disconnected from pipe segment 4, the brake is engaged, rotation stops, and the spindle assembly is moved back along drill frame 6 to begin an additional iteration of the process.

One of ordinary skill in the art will appreciate that the above steps may be performed substantially in reverse to remove a pipe segment from a pipe string during backreaming operations of the horizontal directional drill 2.

It should be appreciated by those skilled in the art that various modifications and variations can be made in the present invention without departing from the scope and spirit of the invention. It is intended that the present invention cover such modifications and variations as come within the scope and spirit of the appended claims and their equivalents.

What is claimed is:

1. An apparatus, comprising:
   a motor;
   a pinion rotationally driven by the motor and having a surface having a plurality of pinion splines formed thereon, the plural pinion splines extending in a parallel relationship;
   a spindle rotationally driven by the pinion, wherein the spindle is connectible to a pipe segment; and
   a brake assembly configured to selectively stop rotation of the pinion, comprising:
      a brake lock having a surface having a plurality of lock splines formed thereon, the plural lock splines extending in a parallel relationship and interlockable with the plural pinion splines; and
      an actuator to move the brake lock between a first position and a second position;
   wherein the brake lock and pinion are engaged and locked against relative rotation in the first position, and are disengaged and relatively rotatable in the second position, in which the brake lock is a hollow member having an interior surface and an exterior surface and in which the plural lock splines are situated only on the interior surface, and in which the brake lock further comprises a plurality of second lock splines situated only on the exterior surface.

2. The apparatus of claim 1 wherein the actuator comprises a spring.

3. The apparatus of claim 2 in which the brake lock surrounds the spring.

4. The apparatus of claim 2 in which the pinion surrounds the spring and the brake lock surrounds the pinion when the brake lock is in the second position.

5. The apparatus of claim 1 further comprising a control system to place the motor in a neutral condition when the brake lock is in the second position.

6. The apparatus of claim 5 wherein the control system comprises a mechanical switch.

7. The apparatus of claim 1 further comprising a gear box for transferring rotation from the motor to the spindle.

8. The apparatus of claim 1 further comprising an air vent in communication with the brake assembly.

9. The apparatus of claim 1 wherein the brake assembly further comprises a brake cap having an inner surface that at least partially conforms to an outer surface of the brake lock, wherein the inner surface of the brake cap and the outer surface of the brake lock interact when the brake lock is in the second position.

10. The apparatus of claim 1 in which the pinion is disposed at least partially within an internal passage formed in the brake lock when the brake lock is in the second position.

11. The apparatus of claim 1 further comprising a pipe segment directly connected to the spindle.

12. The apparatus of claim 1 wherein the shape of the brake lock is complementary to the shape of at least a portion of the pinion.

13. The apparatus of claim 1 further comprising an elongate drill string formed from a plurality of tubular pipe segments arranged in end-to-end engagement, the drill string rotationally coupled to the spindle.

14. The apparatus of claim 1 in which the plural pinion splines extend along a length of the pinion.

15. The apparatus of claim 1 in which the plural lock splines and the plural second lock splines extend in a parallel relationship.

16. The apparatus of claim 1 in which the brake lock and the pinion each have a central longitudinal axis, in which the central longitudinal axis of the brake lock is coincident with the central longitudinal axis of the pinion.

17. The apparatus of claim 1 in which the plural pinion splines extend parallel to a rotational axis of the pinion.

18. A horizontal directional drill comprising:
a frame;
a carriage movable along the frame; and
the apparatus of claim 1.

19. A method of using the apparatus of claim 1, comprising:
rotating the spindle and the pinion; and
moving the brake lock from the first position to the second position such that the brake lock interlocks with the pinion and stops its rotation.

20. The method of claim 19 wherein the brake lock is moved from the first position to the second position by a spring.

21. The method of claim 19 wherein the brake lock is moved from the first position to the second position by a hydraulic cylinder.

22. The method of claim 19 further comprising placing the motor into neutral.

23. The method of claim 19 wherein the motor is automatically placed into neutral upon moving the brake lock from the first position.

24. The method of claim 19 further comprising advancing and rotating the spindle to advance a drill string.

25. The method of claim 24 further comprising rotating the spindle to disconnect a pipe segment from the drill string.

26. The method of claim 25 further comprising retracting and rotating the spindle to advance a backreamer.

27. An apparatus, comprising:
a motor;
a spindle connectable to a pipe segment;
a drive train configured to rotationally couple the motor to the spindle, and comprising:
a rotatable pinion; and
a brake assembly configured to selectively stop rotation of the pinion, comprising:
a brake lock; and
an actuator configured to move the brake lock between a first position, in which the brake lock surrounds and engages a periphery of the pinion, and a second position, in which the brake lock does not surround and does not engage the same periphery.

28. The apparatus of claim 27 in which the brake lock is characterized as a hollow member having an interior region within which the pinion is at least partially receivable.

29. The apparatus of claim 27 in which the pinion is characterized as an elongate member having a pair of opposed ends separated by an intermediate section, in which the periphery of the pinion surroundable by the brake lock is situated adjacent one of the ends, and in which the apparatus further comprises:
a gear intermeshed with the pinion at its intermediate section.

30. An apparatus, comprising:
a motor;
a pinion rotationally driven by the motor and having a surface having a plurality of pinion splines formed thereon;
a spindle rotationally driven by the pinion, wherein the spindle is connectible to a pipe segment; and
a brake assembly comprising:
a brake lock having a surface having a plurality of lock splines formed thereon, the plural lock splines engageable with the plural pinion splines; and
an actuator comprising a spring and configured to move the brake lock between a first position and a second position, in which the brake lock surrounds the spring;
wherein the brake lock and pinion are engaged and locked against relative rotation in the first position, and are disengaged and relatively rotatable in the second position.

* * * * *

UNITED STATES PATENT AND TRADEMARK OFFICE
CERTIFICATE OF CORRECTION

PATENT NO.         : 10,407,991 B2
APPLICATION NO.    : 14/846156
DATED              : September 10, 2019
INVENTOR(S)        : Metcalf et al.

It is certified that error appears in the above-identified patent and that said Letters Patent is hereby corrected as shown below:

In the Specification

Column 4, Line 34, delete "is".
Column 5, Line 10, after "84", delete "," and substitute therefore ".".

Signed and Sealed this
Fifteenth Day of October, 2019

Andrei Iancu
*Director of the United States Patent and Trademark Office*